United States Patent [19]

Dauksys

[11] 3,856,549

[45] Dec. 24, 1974

[54] METHOD FOR STABILIZING POLYBENZIMIDAZOLES

[76] Inventor: Richard J. Dauksys, 49 Nuthatch Knob, Bellbrook, Ohio 06033

[22] Filed: June 4, 1973

[21] Appl. No.: 366,912

[52] U.S. Cl... 117/33.3, 117/138.8 R, 117/138.8 N, 260/45.75 R
[51] Int. Cl............................ B44d 1/06, B44d 5/06
[58] Field of Search... 117/138.5, 138.8 R, 138.8 N, 117/160 R, 169 R, 33.3; 260/45.75 R; 252/385, 397, 400

[56] References Cited
UNITED STATES PATENTS

| | | | |
|---|---|---|---|
| 2,818,407 | 12/1957 | Aldrich | 260/94.3 |
| 3,092,599 | 6/1963 | Hahn | 260/29.6 |
| 3,174,947 | 3/1965 | Marvel et al. | 260/47 |
| 3,573,970 | 4/1971 | Langley | 117/119 |

Primary Examiner—John D. Welsh
Assistant Examiner—P. E. Willis
Attorney, Agent, or Firm—Harry A. Herbert, Jr.; Cedric H. Kuhn

[57] ABSTRACT

A method is provided for improving the ultraviolet light stability of polybenzimidazoles whereby the polymers are immersed in a solution of osmium tetroxide and sodium iodate. The polymers that are treated in this manner retain their physical properties to a substantial degree after prolonged exposure to ultraviolet light. Furthermore, crazing or cracking of the polymers is virtually eliminated.

6 Claims, No Drawings

METHOD FOR STABILIZING POLYBENZIMIDAZOLES

RIGHTS OF THE GOVERNMENT

There is reserved to the Government of the United States a non-exclusive, irrevocable, royalty-free license in the invention described herein with power to grant licenses for all governmental purposes.

FIELD OF THE INVENTION

This invention relates to a method for stabilizing polybenzimidazoles against degradation by ultraviolet radiation. In one aspect it relates to polybenzimidazoles that are stabilized against degradation by ultraviolet radiation.

BACKGROUND OF THE INVENTION

Polybenzimidazoles and a process for their preparation are disclosed by C. S. Marvel et al., in U.S. Pat. No. 3,174,947 (1965). The polymers are especially useful in the form of fibers and films which are highly resistant to degradation by heat, hydrolytic media and oxidizing media. However, polybenzimidazoles are susceptible to degradation when exposed to light in the ultraviolet portion of the spectrum. The degradation that occurs generally results in the loss of tensile strength and other physical properties and in cracking or crazing caused by embrittlement. Up to the present time, no satisfactory solution appears to have been suggested to the problem of polymer degradation by ultraviolet radiation.

It is an object of this invention, therefore, to provide a method for stabilizing polybenzimidazoles against degradation by ultraviolet light.

Another object of the invention is to provide a method for stabilizing polybenzimidazole fibers and fabrics.

Other objects and advantages of the invention will become apparent to those skilled in the art upon consideration of the accompanying disclosure.

SUMMARY OF THE INVENTION

The present invention broadly resides in a method for stabilizing a polybenzimidazole against degradation by ultraviolet light in which the polymer is immersed in a bath comprising osmium tetroxide. Treatment of the polymer in this manner has been found to result in a product that retains its physical properties and is not subject to cracking after exposure to ultraviolet light. It is not intended to limit the invention to any particular theory, but it is believed that the primary mechanism whereby the polymer is stabilized involves cleavage of —N=C— bonds. As a result complexes are formed which are not ultraviolet sensitive.

In a more specific and especially preferred embodiment of the invention, the polybenzimidazole, usually in the form of a shaped article, such as a fiber, yarn, fabric or film, is immersed in a bath comprising a solution of osmium tetroxide and sodium iodate. The presence of the sodium iodate in the solution constitutes an important aspect of the invention. Thus, osmium tetroxide reduced to osmium dioxide or osmium metal during conduct of the method is oxidized to its original $OsO_4$ state as a result of the sodium iodate functioning as an oxidizing agent. A regenerative method is thereby provided, enabling a solution to be used over long periods of time without adding more of the osmium tetroxide. Because of the high cost of the osmium compound, this embodiment of the invention is important from an economic as well as from an operational standpoint.

The method of this invention is applicable to the stabilization of polybenzimidazoles in general. Examples of such polymers include poly-2,6-(phenylene)-diimidazobenzene, poly-2,2'-(furylene-2'',5'')-5,5'-bibenzimidazole, poly-2,2'-(biphenylene-4'',4''')-5,5'-bibenzimidazole, poly-2,2'-)naphthalene-1''',6'')-5,5'-bibenzimidazole, poly-2,2'-)phenylene)-5,5'-bibenzimidazole, and the like. As previously indicated, polybenzimidazoles and a process for their production are disclosed in U.S. Pat. No. 3,174,947.

In conducting the method of this invention, the osmium tetroxide is dissolved in a solvent therefor. Suitable solvents for use in the method include ethyl ether, pyridine and dioxane. It is generally preferred to employ dioxane as the solvent. The osmium tetroxide is usually added to the solvent in an amount ranging from about 0.05 to 1.0 gram per liter of solution.

When proceeding in accordance with the preferred embodiment of the invention, the preferred procedure in preparing the bath is to dissolve the sodium iodate in water. The resulting solution is then added to the solution of osmium tetroxide while stirring. Since water, the solvent for sodium iodate, is miscible with the solvent for the osmium tetroxide, a homogeneous solution of osmium tetroxide and sodium iodate is thereby formed. The homogeneous solution so prepared generally consists essentially of about 5 to 95 volume percent water and 95 to 5 volume percent solvent for osmium tetroxide having dissolved therein about 0.05 to 1.0 gram of osmium tetroxide and about 15 to 200, preferably 25 to 75, grams of sodium iodate per liter of solution.

The polybenzimidazole is immersed in the solution for a period of at least 5 minutes, e.g., for a period ranging from 5 minutes to 5 hours. The preferred immersion time is in the range of about 0.5 to 1.5 hours. During the period of immersion the solution is maintained at a temperature in the range of about 20° to 100°C. It has been found that optimum results are obtained when the polymer is immersed in a solution maintained at a temperature of 75° to 80°C for a period of 0.75 to 1.0 hour.

A more complete understanding of the invention can be obtained by referring to the following illustrative example which is not intended, however, to be unduly limitative of the invention.

EXAMPLE

A series of runs was carried out in which a fabric woven from fibers of poly-2,2' (metaphenylene)-5,5'-benzimidazole was stabilized against degradation by ultraviolet light in accordance with the method of this invention. The fabric used was a 2/2 twill weave with no finish.

A homogeneous solution was prepared by dissolving osmium tetroxide in dioxane after which sodium iodate dissolved in water was added thereto while stirring. The solution contained the indicated components in the following amounts:

| | |
|---|---|
| $OsO_4$ | 0.5g |
| $NaIO_4$ | 40 g |
| Dioxane | 200 mls |
| Water | 200 mls |

TABLE

| Condition[1] of Specimen | Immersion Time, min | Solution Temp, °C | Breaking Load, lbs | % Retention of Strength |
|---|---|---|---|---|
| A[2] | — | — | 100[3] | — |
| B[2] | — | — | 55.2[4] | 55.2 |
| C | 5 | 70 | 63.0[3] | 63.0 |
| C | 15 | 67–70 | 70.6[3] | 70.6 |
| C | 45 | 75–80 | 95.5[3] | 95.5 |

[1] A - As-received fabric, neither washed nor exposed to ultraviolet light.
B - Washed and exposed to ultraviolet light but not treated.
C - Washed, exposed to ultraviolet light, and treated.
[2] Control runs.
[3] Average of 5 runs.
[4] Average of 3 runs.

The solution was heated at 88°–89°C for 1 hour after which an additional 150 mls of water was added. The solution was then heated at 89.5°–90°C for 2 hours. At the end of this period, the solution was cooled to room temperature and allowed to stand for about 15 hours. The temperature was then raised to 89.5°C for 3 hours after which the solution was cooled to room temperature. 275 milliliters of the solution was stored in a brown bottle for future use. The remaining 275 mls was diluted with 450 mls of water and used in the runs. This solution contained the following amounts of the components:

| | |
|---|---|
| $OsO_4$ | 0.25g |
| $NaIO_4$ | 20 g |
| Dioxane | 100 mls |
| Water | 625 mls |

Test specimens were ravel strips cut from the fabric with the longest length parallel to the wrap direction of the fabric. The strips were 1 inch wide and 6 inches long. The fabric from which the strips were cut had been washed in 4 gallons of water containing two cups of Tide detergent and maintained at 120°F. The strips were immersed in the above-described solution under the conditions set forth in the table hereinafter. After the treatment the strips were washed in the aforementioned detergent solution, thoroughly rinsed with deionized water, and then dried at room temperature. This washing and drying of the treated strips was repeated.

After the final drying the treated specimens were exposed to ultraviolet light for a period of 150.1 hours. The ultraviolet light exposure was conducted in an Atlas Weather Ometer (Model XW). The distance of the specimens from the ultraviolet source generated by carbon electrodes was 14 inches.

Control runs were also conducted in which an untreated specimen was exposed to ultraviolet light as indicated in the preceding paragraph.

Mechanical tests, which were conducted prior to and after exposure to ultraviolet light, were of the ravel strip breaking type. The testing machine used was an Instron Universal Testing Machine. Specimens were tested with a 3 inch gage length at a cross-head speed of 12 inch per minute.

Information concerning conditions of the runs as well as the results of the tests are shown in the following table.

The data in the above table indicate that the untreated specimens subjected to ultraviolet radiation lost nearly 50 percent of their original breaking load strength. As compared to the untreated specimens, specimens treated for only 5 minutes showed some improvement. And when the specimens were treated for 45 minutes under the indicated conditions, they underwent a loss in strength of less than 5 percent. The specimens were virtually unchanged in appearance after treatment and after treatment and exposure to ultraviolet light. However, the untreated specimens were observed to fade after ultraviolet light exposure.

As will be evident to those skilled in the art, various modifications of the invention can be made or followed in view of the foregoing disclosure without departing from the spirit or scope of the invention.

I claim:

1. A process for stabilizing a shaped article of a polybenzimidazole against degradation by ultraviolet light which comprises immersing the article for a period ranging from 5 minutes to 5 hours in a solution comprising osmium tetroxide and a solvent therefor selected from the group consisting of ethyl ether, pyridine and dioxane, the amount of osmium tetroxide in solution ranging from about 0.05 to 1.0 gram per liter of solution and the solution being at a temperature ranging from about 20 to 100°C.

2. The process according to claim 1 in which the article is immersed in a homogeneous colution consisting essentially of 5 to 95 volume percent water and 95 to 5 volume percent of the solvent for the osmium tetroxide, the solution having dissolved therein about 0.05 to 1.0 gram of osmium tetroxide and about 15 to 200 grams of sodium iodate, each amount being based on one liter of solution.

3. The process according to claim 2 in which the article is immersed in the solution maintained at a temperature of 75° to 80°C for a period of 0.75 to 1.0 hour.

4. The process according to claim 2 in which the amount of sodium iodate is in the range of 25 to 75 grams per liter of solution.

5. The process according to claim 2 in which the shaped article is a fabric.

6. The process according to claim 2 in which the shaped article is a fiber.

* * * * *